US007792623B2

(12) United States Patent
Kuwahara et al.

(10) Patent No.: US 7,792,623 B2
(45) Date of Patent: Sep. 7, 2010

(54) DRIVING SOURCE CONTROLLER AND CONTROL METHOD

(75) Inventors: Seiji Kuwahara, Toyota (JP); Masato Kaigawa, Toyota (JP); Hideki Kubonoya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 96 days.

(21) Appl. No.: 12/216,494

(22) Filed: Jul. 7, 2008

(65) Prior Publication Data

US 2009/0024288 A1 Jan. 22, 2009

(30) Foreign Application Priority Data

Jul. 18, 2007 (JP) ............................ 2007-186551

(51) Int. Cl.
*G06F 7/00* (2006.01)

(52) U.S. Cl. .......................... 701/54; 701/110; 123/352

(58) Field of Classification Search .................. 701/54, 701/110; 123/349, 352, 355, 350
See application file for complete search history.

(56) References Cited

U.S. PATENT DOCUMENTS

| | | | |
|---|---|---|---|
| 5,269,271 A | 12/1993 | Kawai et al. |
| 7,027,904 B2 | 4/2006 | Ishizu et al. |
| 2002/0055814 A1 | 5/2002 | Kobayashi et al. |
| 2003/0060961 A1 | 3/2003 | Ishizu et al. |
| 2009/0037066 A1 | 2/2009 | Kuwahara et al. |

FOREIGN PATENT DOCUMENTS

| | | |
|---|---|---|
| DE | 692 26 709 T2 | 5/1999 |
| DE | 101 58 572 A1 | 6/2003 |
| JP | A-2002-147279 | 5/2002 |
| JP | A-2003-120349 | 4/2003 |
| JP | A-2003-170759 | 6/2003 |
| JP | A-2006-183585 | 7/2006 |
| JP | A-2007-64180 | 3/2007 |
| JP | A-2007-132203 | 5/2007 |
| WO | WO 2007/055144 A1 | 5/2007 |

OTHER PUBLICATIONS

German Office Action for German Patent Application No. 10 2008 040 518.3-26 dated Apr. 1, 2010 with English translation.

*Primary Examiner*—Khoi Tran
*Assistant Examiner*—Brian J Broadhead
(74) *Attorney, Agent, or Firm*—Oliff & Berridge, PLC

(57) ABSTRACT

An ECU executes a program including the steps of: detecting engine speed NE based on a signal transmitted from an engine speed sensor; calculating engine speed NE with dead time of the engine with respect to a target output torque removed; calculating engine speed NE reflecting the dead time of the engine with respect to the target output torque; correcting the actual engine speed NE in accordance with a difference between the engine speed with dead time removed and the engine speed reflecting the dead time; and setting the target value of output torque in accordance with the corrected engine speed NE.

6 Claims, 5 Drawing Sheets

DRIVING SOURCE CONTROLLER AND CONTROL METHOD

This nonprovisional application is based on Japanese Patent Application No. 2007-186551 filed with the Japan Patent Office on Jul. 18, 2007, the entire contents of which are hereby incorporated by reference.

BACKGROUND OF THE INVENTION

1. Field of the Invention

The present invention relates to a controller and a control method for a driving source and, more specifically, to a technique for controlling a driving source such that a difference between an actually output torque and a target value set in accordance with an output shaft speed (number of rotations) of the driving source becomes smaller.

2. Description of the Background Art

Conventionally, an engine used as a driving source for a vehicle has been known. The engine is controlled such that torque in accordance with an accelerator position is output. The engine output torque is adjusted based on a throttle opening position, phase of an intake valve, amount of fuel injection, ignition timing and the like.

The torque to be output by the engine changes in accordance with the request by a driver and, in addition, the state of operation of engine itself, state of automatic transmission, and vehicle behavior. Therefore, it is difficult to set the throttle opening position, phase of intake valve, amount of fuel injection, ignition timing and the like directly from the accelerator position. Therefore, the throttle opening position, phase of intake valve, amount of fuel injection, ignition timing and the like are determined in accordance with a target value of output torque of the engine. The target output torque of the engine can be set in consideration of a parameter or parameters other than the accelerator position, such as the output shaft speed of the engine (see, for example, page 27 of Japanese Patent Laying-Open No. 2003-120349).

In a driving source control system, there is a dead time from the input of target value of output torque to the output of a command value of, for example, the ignition timing. Therefore, if the target output torque is set from the output shaft speed as described in Japanese Patent Laying-Open No. 2003-120349, there is a time lag from the output of target output torque until the output torque corresponding to the target value is attained. Therefore, the next target value may possibly be set using the output shaft speed that has not yet reflected the change corresponding to the target output torque set last time. This may lead to setting of a target value larger than necessary, or a target value smaller than necessary. As a result, the output torque of driving source becomes unstable.

SUMMARY OF THE INVENTION

An object of the present invention is to provide a controller and control method for a driving source that can improve the stability of output torque of the driving source.

According to an aspect, a controller for a driving source includes a speed sensor (rotation number sensor) for detecting an actual first output shaft speed of the driving source, and a control unit. The control unit controls the driving source such that a difference between an actual output torque of the driving source and a target value of output torque of the driving source becomes smaller, calculates a second output shaft speed with dead time of the driving source with respect to the target value removed, from the target value, calculates a third output shaft speed reflecting the dead time of the driving source with respect to the target value, from the target value, corrects the detected first output shaft speed, in accordance with a difference between the second output shaft speed and the third output shaft speed, and sets the target value of output torque of the driving source, in accordance with the corrected first output shaft speed.

In this arrangement, the actual first output shaft speed of the driving source is detected. The driving source is controlled such that the difference between the actual output torque of the driving source and the target value of output torque of the driving source becomes smaller. The target value of output torque is determined in accordance with the actual first output shaft speed of the driving source. The actual first output shaft speed of the driving source reflects the dead time of driving source with respect to the target value of output torque. Therefore, it is desirable to make smaller the influence of dead time on the first output shaft speed. For this purpose, a second output shaft speed, with the dead time of driving source with respect to the target value removed, is calculated from the target value. Further, a third output shaft speed reflecting the dead time of driving source with respect to the target value is also calculated. In accordance with the difference between the second and third output shaft speeds, the detected first output shaft speed is corrected. Thus, the influence of dead time on the actual output shaft speed can be reduced. As a result, the time lag between the target value of output torque and the output shaft speed used for setting the target value can be made smaller. In accordance with the corrected first output shaft speed, the target value of output torque of the driving source is set. Therefore, it becomes possible to set the next target value using the output shaft speed that reflects the change in accordance with the target value of output torque set last time. Therefore, unnecessary fluctuation of the target value can be made smaller. As a result, stability of the output torque of driving source can be improved.

Preferably, the second control unit corrects, when the second output shaft speed is larger than the third output shaft speed, the detected first output shaft speed by an amount in accordance with the difference between the second and third output shaft speeds, so that the first output shaft speed increases, and when the second output shaft speed is smaller than the third output shaft speed, corrects the detected first output shaft speed by an amount in accordance with the difference between the second and third output shaft speeds, so that the first output shaft speed decreases.

In this arrangement, if the second output shaft speed is larger than the third output shaft speed, correction is done by the amount in accordance with the difference between the second output shaft speed and the third output shaft speed, so that the detected first output shaft speed increases. If the second output shaft speed is smaller than the third output shaft speed, correction is done by the amount in accordance with the difference between the second output shaft speed and the third output shaft speed, so that the detected first output shaft speed decreases. Thus, the influence of dead time on the first speed can be reduced. As a result, the time lag between the target value of output torque and the output shaft speed used for setting the target value can be made smaller.

More preferably, the control unit calculates the second output shaft speed from the target value, using a first function, and calculates the third output shaft speed from the target value, using a second function.

In this arrangement, the second output shaft speed with the dead time removed, and the third output shaft speed with the dead time reflected, can be calculated by using functions.

More preferably, the driving source is an internal combustion engine.

By this arrangement, stability of output torque of the internal combustion engine can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
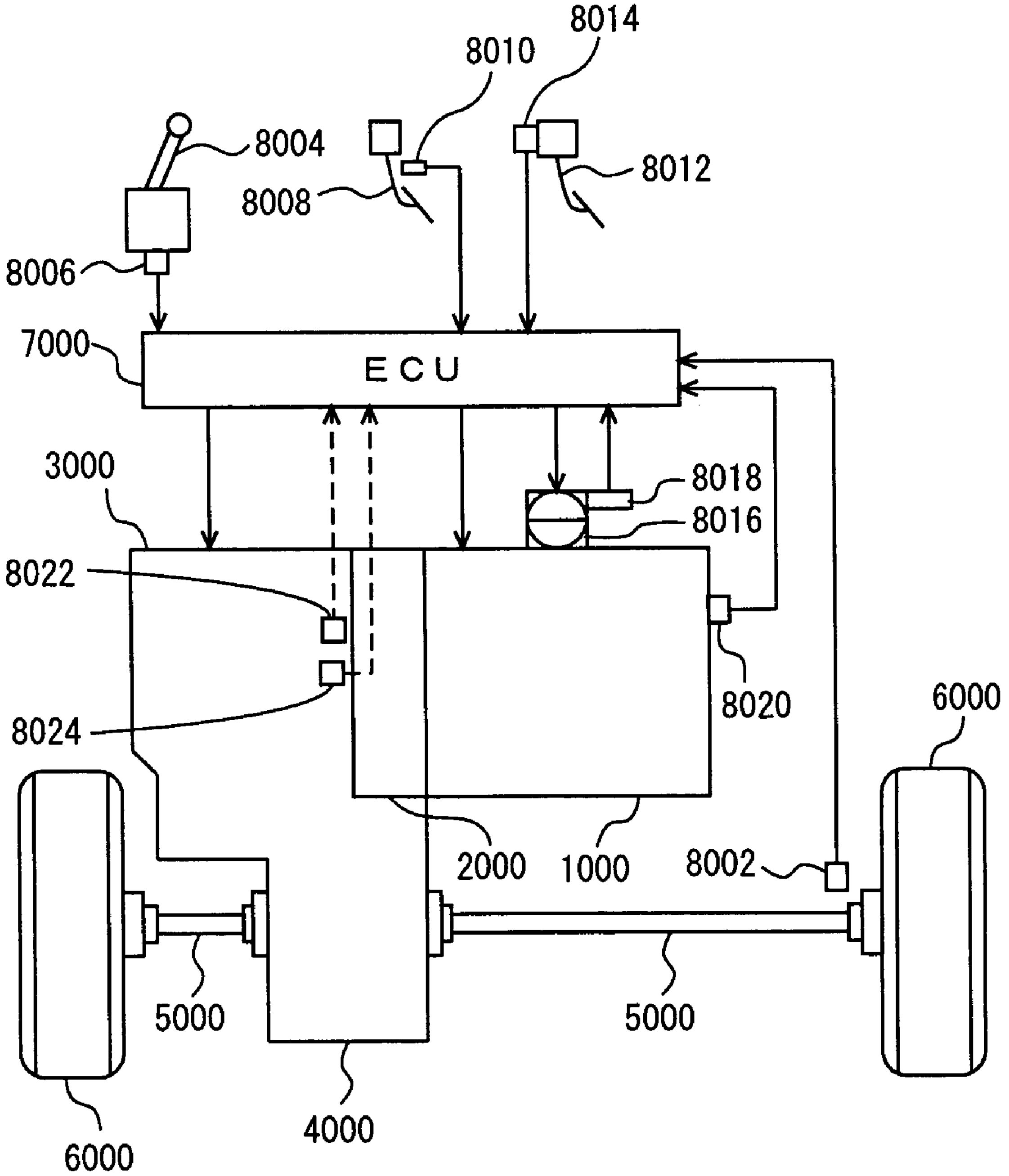
FIG. 1 is a schematic view showing a structure of a vehicle.

In the following, an embodiment of the present invention will be described with reference to the figures. In the following description, the same components are denoted by the same reference characters. Their names and functions are also the same. Therefore, detailed description thereof will not be repeated.

Referring to FIG. 1, the vehicle having the controller in accordance with an embodiment of the present invention will be described. The vehicle is an FF (Front engine Front drive) vehicle. It is noted that the vehicle may be a vehicle such as an FR (Front engine Rear drive) vehicle other than the FF vehicle.

The vehicle includes an engine 1000, a torque converter 2000, an automatic transmission 3000, a differential gear 4000, a drive shaft 5000, front wheels 6000 and an ECU (Electronic Control Unit) 7000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An amount of fuel injected from the injector is determined in accordance with an amount of air taken into engine 1000 such that a desired air-fuel ratio (for example, stoichiometric air-fuel ratio) is attained. A motor may be used as a driving source, in place of the engine.

Automatic transmission 3000 is coupled to engine 1000 with torque converter 2000 being interposed. Therefore, an output shaft speed of torque converter 2000 (a turbine speed NT) is equal to an input shaft speed of automatic transmission 3000.

Automatic transmission 3000 has a planetary gear unit. Automatic transmission 3000 converts the rotation speed of the crankshaft to a desired speed by realizing a desired gear. Instead of the automatic transmission achieving the gear, a CVT (Continuously Variable Transmission) that continuously varies a gear ratio may be mounted. Alternatively, an automatic transmission including constant mesh gears shifted by means of a hydraulic actuator may be mounted.

An output gear of automatic transmission 3000 meshes with differential gear 4000. Drive shaft 5000 is coupled to differential gear 4000 by spline-fitting or the like. A motive power is transmitted to left and right front wheels 6000 via drive shaft 5000.

Wheel speed sensors 8002, a position sensor 8006 of a shift lever 8004, an accelerator pedal position sensor 8010 of an accelerator pedal 8008, a stroke sensor 8014 of a brake pedal 8012, a throttle opening position sensor 8018 of an electronic throttle valve 8016, an engine speed sensor 8020, an input shaft speed sensor 8022 and an output shaft speed sensor 8024 are connected to ECU 7000 via a harness and the like.

Wheel speed sensors 8002 detect the wheel speeds of the four wheels of the vehicle, respectively, and transmit signals representing the detected results to ECU 7000. The position of shift lever 8004 is detected by position sensor 8006, and a signal representing the detected result is transmitted to ECU 7000. A gear of automatic transmission 3000 is automatically selected corresponding to the position of shift lever 8004. Additionally, such a configuration may be employed that the driver can select a manual shift mode for arbitrarily selecting a gear according to the driver's operation.

Accelerator pedal position sensor 8010 detects the stepped amount (accelerator position) of accelerator pedal 8008 operated by the driver, and transmits a signal representing the detected result to ECU 7000. Stroke sensor 8014 detects the stroke amount of brake pedal 8012 operated by the driver, and transmits a signal representing the detected result to ECU 7000.

Throttle opening position sensor 8018 detects the degree of opening (throttle opening position) of electronic throttle valve 8016 of which position is adjusted by the actuator, and transmits a signal representing the detected result to ECU 7000. Electronic throttle valve 8016 regulates the amount of air (output of engine 1000) taken into engine 1000. The amount of air taken into engine 1000 increases as the throttle opening increases. Thus, the throttle opening position can be used as a value representing the output of engine 1000. The amount of air may be regulated by varying a lift amount or an angle of action of an intake valve (not shown) provided in the cylinder. Here, the amount of air increases as the lift amount and/or the angle of action increases.

Engine speed sensor 8020 detects the number of rotations (engine speed NE) of the output shaft (crankshaft) of engine 1000, and transmits a signal representing the detected result to ECU 7000. Input shaft speed sensor 8022 detects an input shaft speed NI (turbine speed NT) of automatic transmission 3000, and transmits a signal representing the detected result to ECU 7000.

Output shaft speed sensor 8024 detects an output shaft speed NO of automatic transmission 3000, and transmits a signal representing the detected result to ECU 7000. ECU 7000 detects the vehicle speed based on output shaft speed NO, a radius of the wheel and the like. The vehicle speed can be detected by a well-known technique, and therefore description thereof is not repeated. In place of the vehicle speed, output shaft speed NO may directly be used.

ECU 7000 controls equipment such that the vehicle attains a desired running state, based on signals sent from the foregoing sensors and the like as well as a map or a program stored in an ROM (Read Only Memory). ECU 7000 may be divided into a plurality of ECUs.

In the present embodiment, when shift lever 8004 is in a D (drive) position and thereby a D (drive) range is selected as the shift range in automatic transmission 3000, ECU 7000 regulates automatic transmission 3000 to achieve one of the first to sixth gears. Since one of the first to sixth gears is achieved, automatic transmission 3000 can transmit a driving force to front wheels 6000. It is noted that the number of gears is not limited to six, and may be seven or eight. The gear of automatic transmission 3000 is set in accordance with a shift map determined by using throttle opening position and vehicle speed. Accelerator position may be used in place of throttle opening position.

Figure 2:
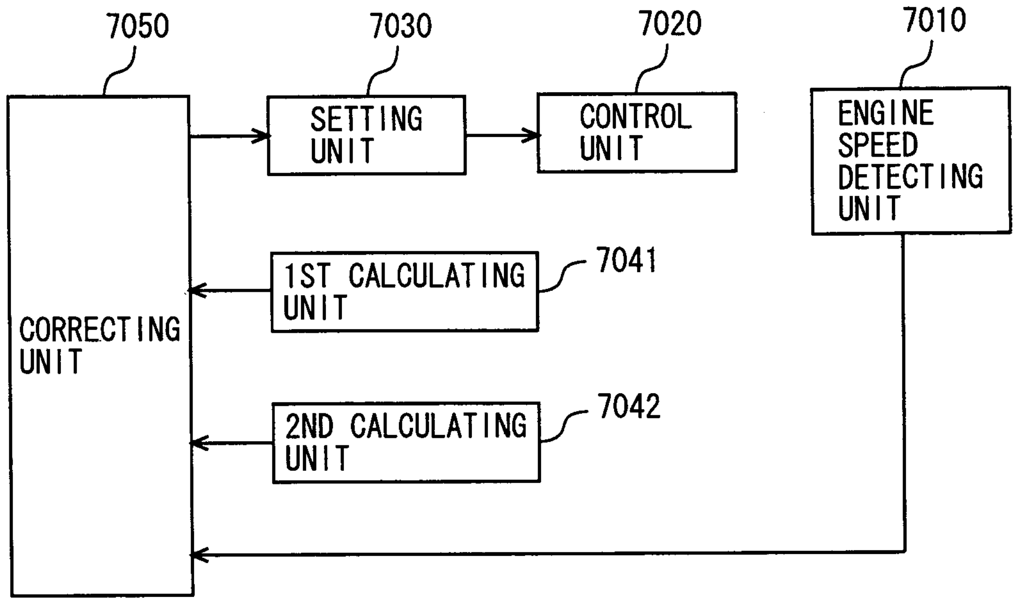
FIG. 2 is a functional block diagram of an ECU.

Referring to FIG. 2, the function of ECU 7000 will be described below. The following function of ECU 7000 may be implemented by either hardware or software.

ECU 7000 includes an engine speed detecting unit 7010, a control unit 7020, a setting unit 7030, a first calculating unit 7041, a second calculating unit 7042, and a correcting unit 7050.

Engine speed detecting unit 7010 detects the engine speed NE based on a signal transmitted from engine speed sensor 8020.

Control unit 7020 controls engine 1000 such that the difference between the target value of output torque set by setting unit 7030 and the actual output torque of engine 1000 becomes smaller. For instance, the target value of throttle opening position is determined by PID (Proportional-plus-Integral-plus-Derivative) control. If the actual output torque is smaller than the target value, a larger target value is set, as the difference between the target value and the actual output torque (absolute value of difference) is larger. If the actual output torque is larger than the target value, a smaller target value is set, as the difference between the target value and the actual output torque (absolute value of difference) is larger. The method of setting the target value of throttle opening position is not limited to this.

Electronic throttle valve 8016 is controlled such that the actual throttle opening position matches the target value. As the electronic valve 8016 is so controlled, the output torque of engine 1000 is regulated. As a result, the engine 1000 is controlled such that the difference between the target value and the actual output torque becomes smaller. In place of the throttle opening position, the target value of amount of intake air, output torque, amount of fuel injection or the like may be determined.

The actual output torque of engine 1000 is calculated by using the first engine model, in accordance with the accelerator position, engine speed NE, throttle opening position and the like. The first engine model is a function determined for calculating the output torque, having the accelerator position, engine speed NE, throttle opening position and the like as parameters. The first engine model is determined in advance using, for example, results of experiments or simulation. For calculating the actual output torque, well-known general technique may be utilized and, therefore, detailed description will not be given here.

Figure 3:
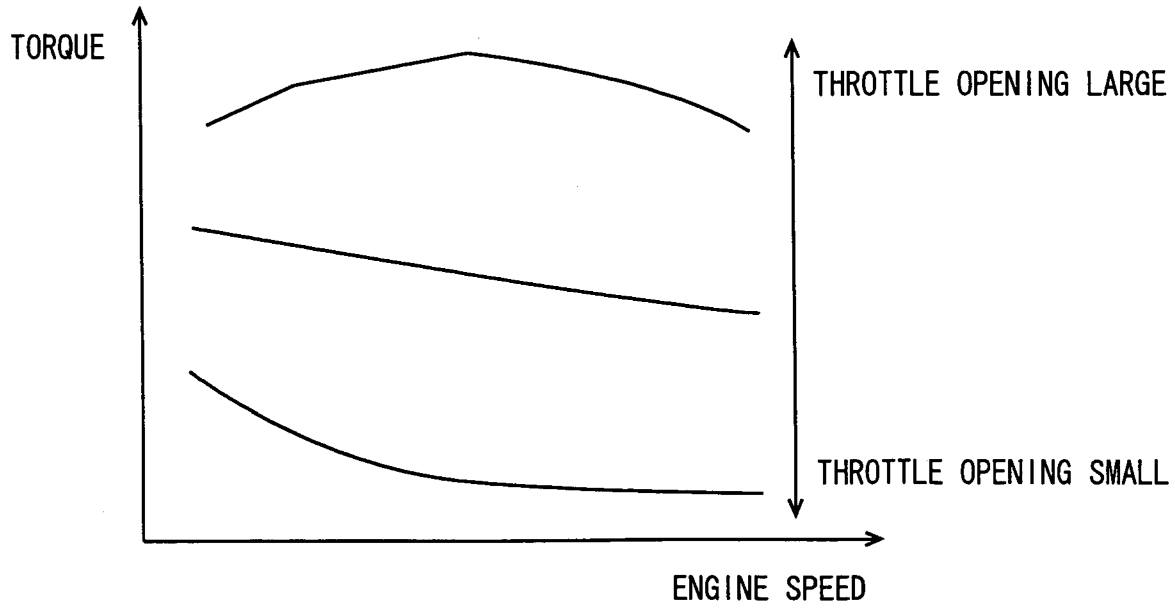
FIG. 3 shows a map determining output torque target value.

Setting unit 7030 sets the target value of output torque of engine 1000, in accordance with the engine speed NE detected by engine speed sensor 8020 and the throttle opening position. By way of example, the target value of output torque is set using the map shown in FIG. 3. The target value of output torque is set to be larger as the throttle opening position (throttle opening position obtained by converting the accelerator position) is larger. The engine speed NE used for setting the target value of output torque is corrected by correcting unit 7050. The method of correcting engine speed NE will be described later.

First calculating unit 7014 calculates the engine speed NE with the dead time of engine 1000 (control system of engine 1000) with respect to the target value of output torque removed, using the second engine model, from the target value of output torque, detected engine speed NE and the like.

Figure 4:
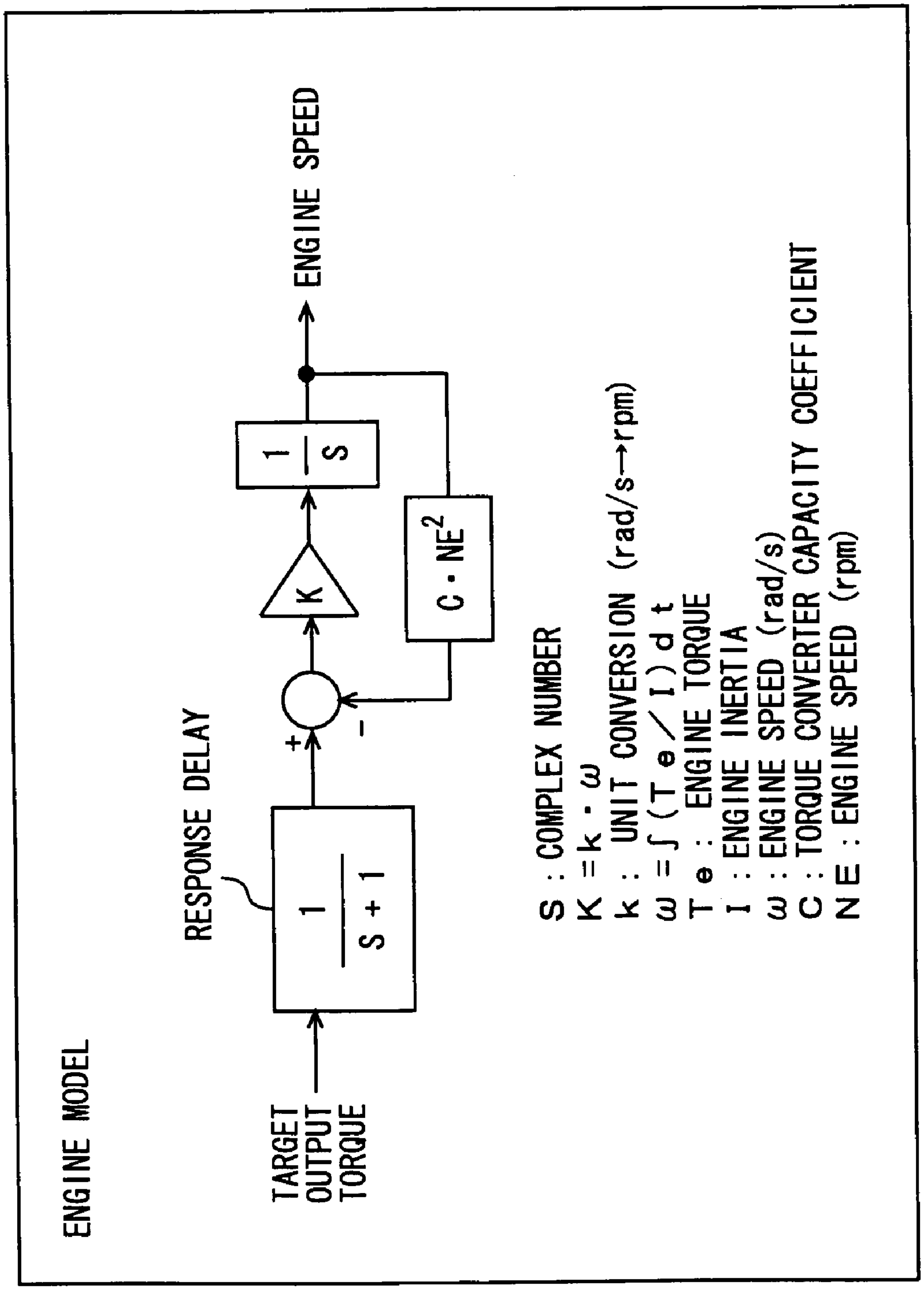
FIG. 4 shows an engine model.

The second engine model is a function determined for calculating the engine speed NE with the dead time removed, having the output torque, detected engine speed NE and the like as parameters. The second engine model is determined in advance using, for example, results of experiments or simulation. The second engine model is as shown in FIG. 4.

The second calculating unit 7042 calculates the engine speed NE with the dead time of engine 1000 (control system of engine 1000) with respect to the target value of output torque reflected, using the third engine model, from the target value of output torque, detected engine speed NE and the like. The third engine model is a function determined for calculating the engine speed NE reflecting the dead time, having the output torque, detected engine speed NE and the like as parameters. The third engine model is determined in advance using, for example, results of experiments or simulation.

Correcting unit 7050 corrects the actual engine speed NE (engine speed NE detected by using engine speed sensor 8020), in accordance with the difference between the engine speed NE with dead time removed and the engine speed NE with dead time reflected.

By way of example, if the engine speed NE with dead time removed is higher than the engine speed NE reflecting dead time, the engine speed is corrected by the difference (absolute value of difference) between the engine speed NE with dead time removed and the engine speed NE with dead time reflected, so that the detected engine speed NE increases.

If the engine speed NE with dead time removed is lower than the engine speed NE reflecting dead time, the engine speed is corrected by the difference between the engine speed NE with dead time removed and the engine speed NE with dead time reflected, so that the detected engine speed NE decreases. The method of correcting detected engine speed NE is not limited to this. The engine speed NE may be corrected by the amount proportional to the difference between the engine speed NE with dead time removed and the engine speed NE with dead time reflected.

Figure 5:
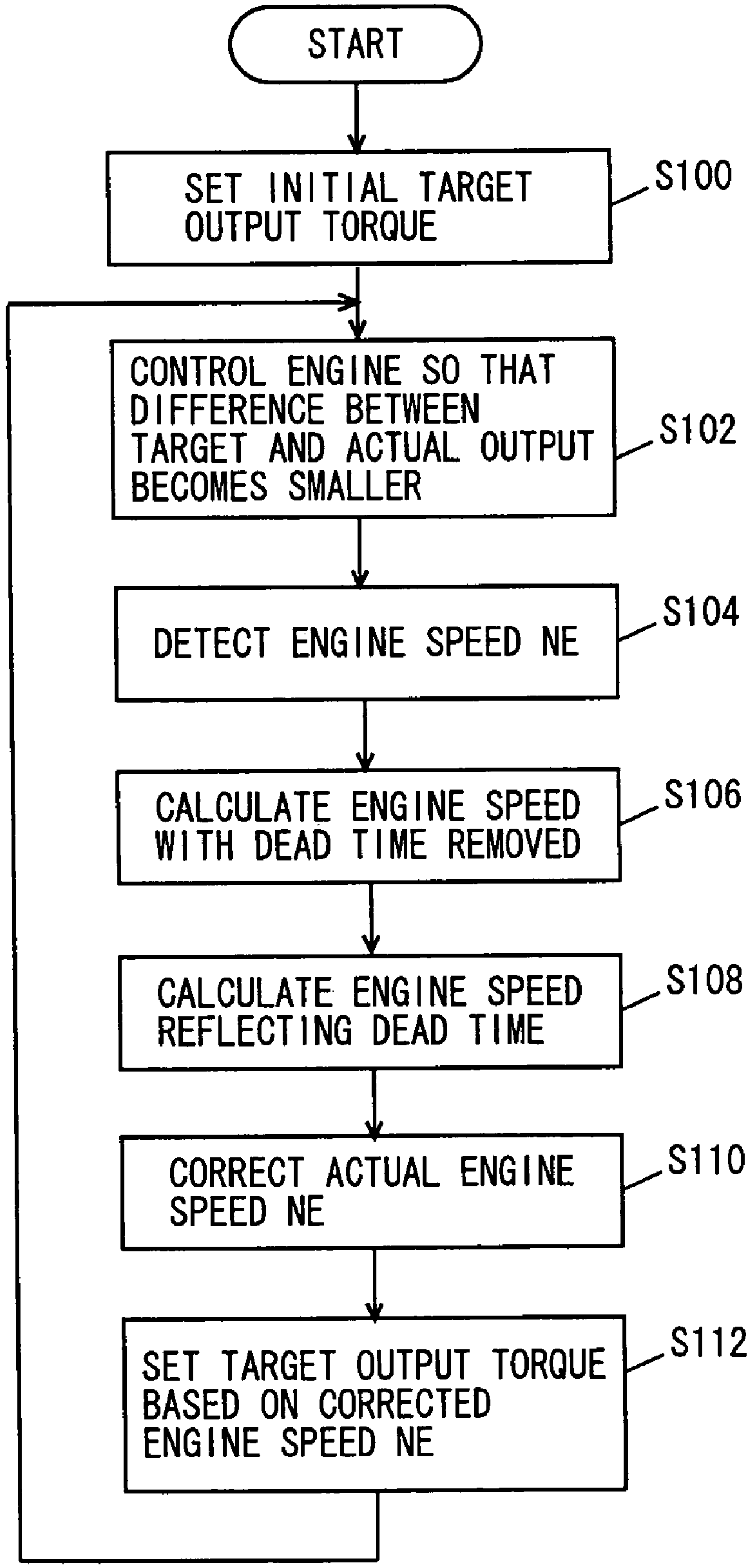
FIG. 5 is a flowchart representing a control structure of a program executed by the ECU.

Referring to FIG. 5, the control structure of a program executed by ECU 7000 will be described. The program described in the following is executed continuously, for example, until the power of ECU 7000 is turned off. The program executed by ECU 7000 may be recorded on a recording medium such as a CD (Compact Disk) or a DVD (Digital Versatile Disk) and commercially distributed.

At step (hereinafter simply denoted by "S") 100, ECU 7000 sets an initial target value of output torque of engine 1000. At S102, ECU 7000 controls engine 1000 such that the difference between the target value of output torque and the actual output torque of engine 1000 becomes smaller. At S104, ECU 7000 detects the engine speed NE based on a signal transmitted from engine speed sensor 8020.

At S106, ECU 7000 calculates engine speed NE with dead time removed, of engine 1000 with respect to the target value of output torque. At S108, ECU 7000 calculates engine speed NE reflecting dead time, of engine 1000 with respect to the target value of output torque.

At S110, ECU 7000 corrects the actual engine speed NE in accordance with the engine speed NE with the dead time removed and the engine speed NE with the dead time reflected.

At S112, ECU sets the target value of output torque of engine 1000, in accordance with the corrected engine speed NE and the throttle opening position. Then, the process returns to S102.

The operation of ECU 7000 based on the structure and flowchart as above will be described.

When ECU 7000 is powered on, the initial target value of output torque of engine 1000 is set (S100). Engine 1000 is controlled such that the target value of output torque and the actual output torque of engine 1000 becomes smaller (S102). Then, engine speed NE is detected (S102).

Figure 6:
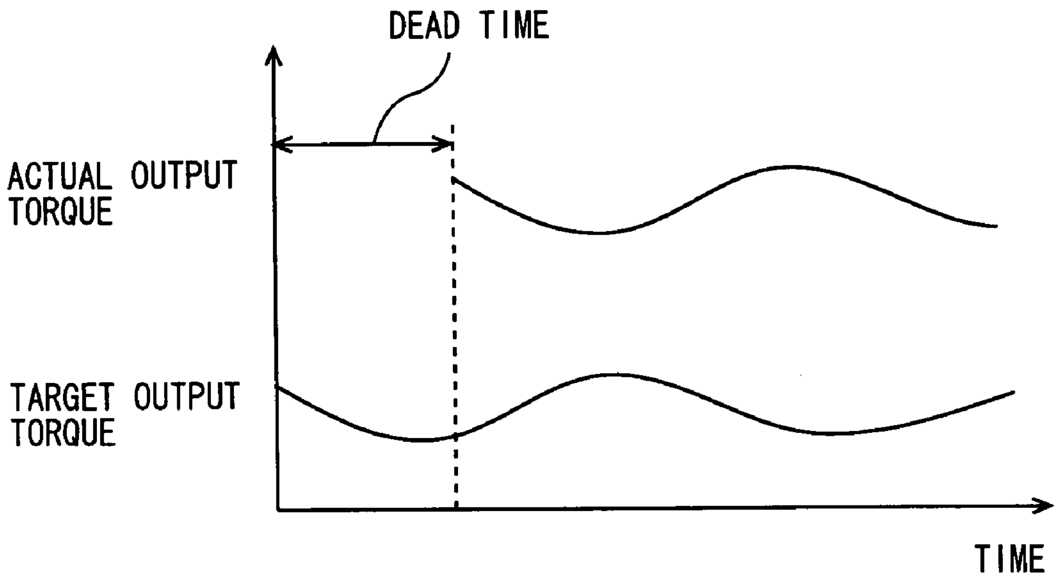
FIG. 6 shows target output torque and actual output torque.

The control system of engine 1000 has a dead time from the input of set target value until command values of throttle opening position, amount of fuel injection, ignition timing and the like are output. Therefore, as shown in FIG. 6, the phase of target output torque and the phase of actually output torque possibly deviate by the amount corresponding to the dead time. Therefore, engine speed NE detected by using engine speed sensor 8020 may possibly be the value not yet reflecting the change in accordance with the target value of output torque.

Therefore, if the target value of output torque is set directly using the engine speed NE detected by using engine speed sensor 8020, a target value larger or smaller than necessary may be set. As a result, the output torque of driving source may possibly become unstable.

Figure 7:
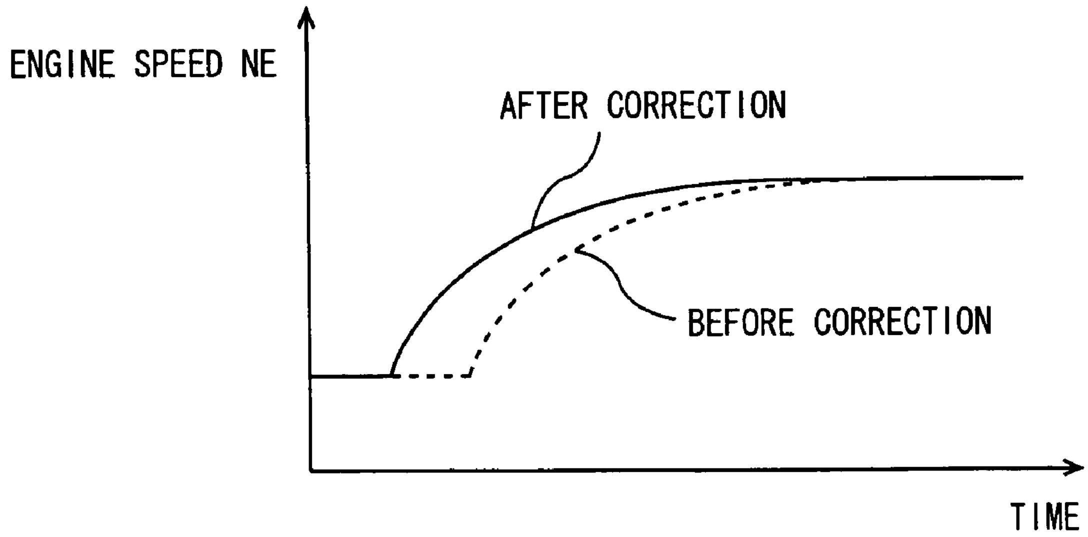
FIG. 7 shows engine speed NE before correction and after correction.

Therefore, using the second engine model, the engine speed NE with the dead time of engine 1000 with respect to the target output torque removed, is calculated (S106). Further, using the third engine model, the engine speed NE reflecting the dead time of engine 1000 with respect to the target output torque, is calculated (S108). In accordance with the difference between the engine speed NE with the dead time removed and the engine speed NE with the dead time reflected, the actual engine speed NE is corrected (S110). Thus, as represented by a solid line in FIG. 7, the influence of dead time on engine speed NE detected by using engine speed sensor 8020 can be reduced.

In accordance with the corrected engine speed NE and the throttle opening position, the target value of output torque of engine 1000 is determined (S112). Consequently, it becomes possible to set the next target value using the engine speed NE that reflects the change in accordance with the target output torque set last time. Therefore, unnecessary fluctuation of target value can be reduced. As a result, stability of output torque of engine 1000 can be improved.

As described above, in the controller in accordance with the present embodiment, the engine speed NE with the dead time of engine with respect to the target value of output torque removed is calculated from the target value of output torque. Further, the engine speed NE reflecting the dead time of engine with respect to the target value of output torque is calculated from the target value of output torque. The actual engine speed NE is corrected, in accordance with the difference between the engine speed NE with dead time removed and the engine speed NE with dead time reflected. Therefore, the influence of dead time on engine speed NE detected by using the engine speed sensor can be reduced. The target value of engine output torque is set in accordance with the corrected engine speed NE and the throttle opening position. Therefore, it becomes possible to set the next target value using the engine speed NE that reflects the change in accordance with the target output torque set last time. Therefore, unnecessary fluctuation of target value can be reduced. As a result, stability of the engine output torque can be improved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of controlling a driving source, comprising the steps of:

detecting an actual first output shaft speed of the driving source;

controlling said driving source such that a difference between an actual output torque of said driving source and a target value of output torque of said driving source becomes smaller;

calculating a second output shaft speed with dead time of said driving source with respect to said target value removed, from said target value, by using a predetermined first function;

calculating a third output shaft speed reflecting the dead time of said driving source with respect to said target value, from said target value, by using a predetermined second function;

correcting said detected first output shaft speed, in accordance with a difference between said second output shaft speed and said third output shaft speed; and setting a target value of output torque of said driving source, in accordance with said corrected first output shaft speed.

2. The method of controlling a driving source according to claim 1, wherein said step of correcting said detected first output shaft speed includes the steps of:

correcting, when said second output shaft speed is larger than said third output shaft speed, said detected first output shaft speed by an amount in accordance with the difference between said second and third output shaft speeds, so that said first output shaft speed increases; and correcting, when said second output shaft speed is smaller than said third output shaft speed, said detected first output shaft speed by an amount in accordance with the difference between said second and third output shaft speeds, so that said first output shaft speed decreases.

3. The method of controlling a driving source according to claim 1, wherein said driving source is an internal combustion engine.

4. A controller for a driving source, comprising:

means for detecting an actual first output shaft speed of the driving source;

means for controlling said driving source such that a difference between an actual output torque of said driving source and a target value of output torque of said driving source becomes smaller;

first calculating means for calculating a second output shaft speed with dead time of said driving source with respect to said target value removed, from said target value, by using a predetermined first function;

second calculating means for calculating a third output shaft speed reflecting the dead time of said driving source with respect to said target value, from said target value, by using a predetermined second function;

correcting means for correcting said detected first output shaft speed, in accordance with a difference between said second output shaft speed and said third output shaft speed; and means for setting a target value of output torque of said driving source, in accordance with said corrected first output shaft speed.

5. The controller for a driving source according to claim 4, wherein said correcting means includes means for correcting, when said second output shaft speed is larger than said third output shaft speed, said detected first output shaft speed by an amount in accordance with the difference between said second and third output shaft speeds, so that said first output shaft speed increases; and means for correcting, when said second output shaft speed is smaller than said third output shaft speed, said detected first output shaft speed by an amount in accordance with the difference between said second and third output shaft speeds, so that said first output shaft speed decreases.

6. The controller for a driving source according to claim 4, wherein said driving source is an internal combustion engine.

* * * * *